Patented Mar. 17, 1953

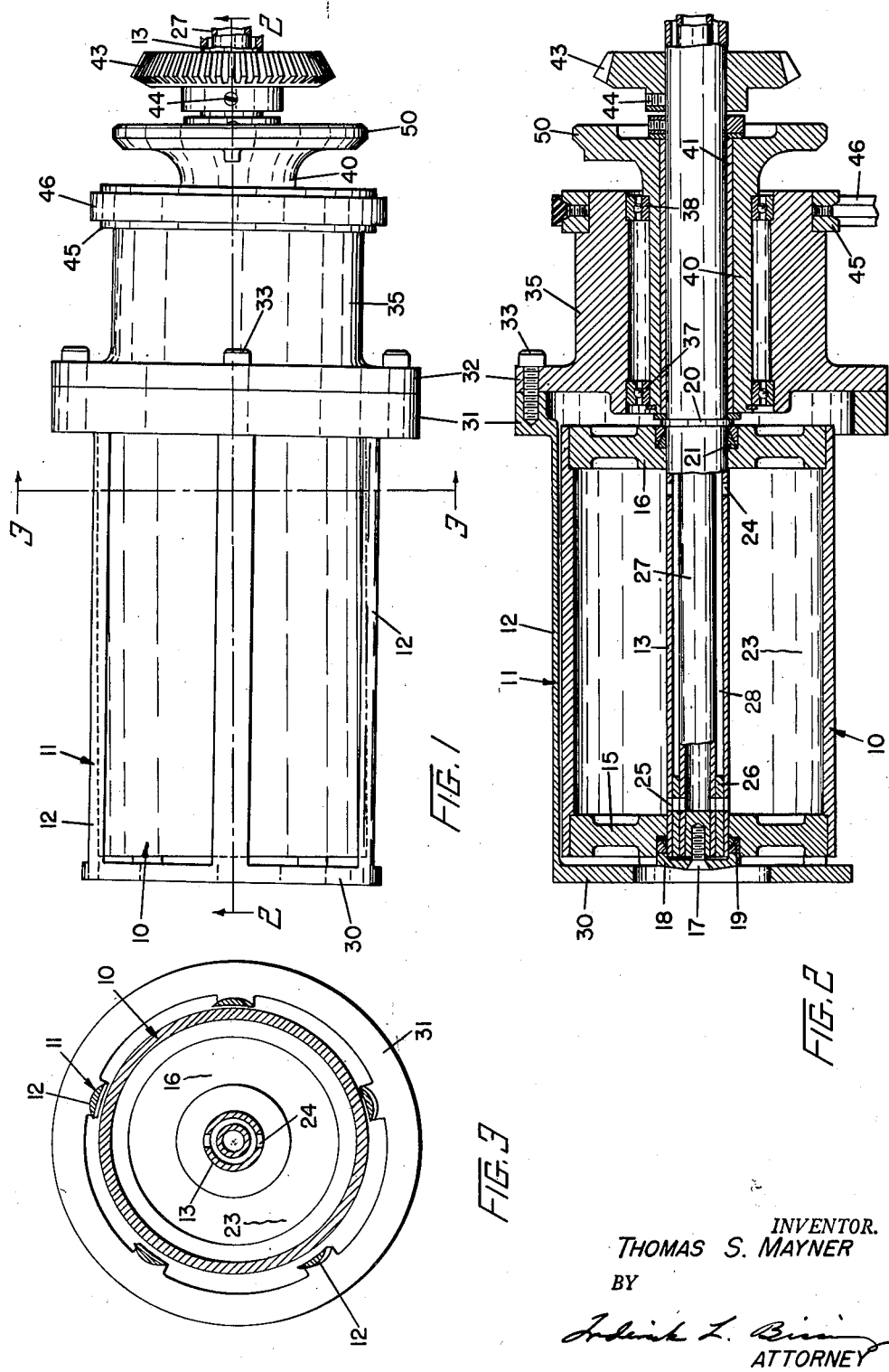

2,631,382

UNITED STATES PATENT OFFICE 2,631,382

THREAD-ADVANCING REEL

Thomas S. Mayner, Willoughby Township, Lake County, Ohio, assignor to Industrial Rayon Corporation, Cleveland, Ohio, a corporation of Delaware Application September 14, 1948, Serial No. 49,213

2 Claims. (Cl. 34—153)

This invention relates to thread-storing, thread-advancing reels. More particularly, the invention relates to internally heated reels adapted for drying thread and the like having a structure comprising at least two separate reel members occupying substantially the same space which cooperate to advance the thread or the like in a plurality of generally helical turns.

The reel of this invention advantageously employs a minimum of parts to provide a sturdy and simple thread-storing and thread-advancing structure. One of the members of the reel can be a cylinder and the other reel member can be one having a minimum of circularly spaced bar members. Of the two reel members the diameter of the cylindrical member is less than that of the bar type reel member so that it can rotate within the circumference described by the spaced bars of the latter. Then by arranging the two reel members eccentrically relative to each other the periphery of the cylindrical reel member will, during rotation, emerge between any two successive bar members of the other reel member. Upon emergence of the periphery of the cylindrical reel member between any two spaced bar members the thread or the yarn is picked up and displaced an amount depending on the eccentricity between the reel members. In this manner the thread is advanced by increments lengthwise of the reel. The rate of advance can be varied in accordance with the amount of displacement of the thread by the reel members and differences in their relative rotation.

Further, the cylindrical construction of the one reel member lends itself advantageously to the use of a heating fluid. By closing the ends of the cylindrical member a heating fluid can be forced through it while thread or yarn is being advanced. Such a reel construction is advantageous for drying in that it provides a large surface area for transmitting heat to the thread or the like which is substantially always in contact with the cylinder.

The reel members comprising the reel of this invention are arranged to rotate on axes that are offset and askew relative to each other. When rotated about such axes the reel members cooperate to advance the thread or the like in a plurality of generally helical turns. The axes can also be offset and in parallel planes, however, in this arrangement a forward actuating means, such as a cam, for one of the reel members would have to be provided.

The reel and its advantages will be more fully described in the following specification and accompanying drawing where: Figure 1 is a plan elevation of the reel; Figure 2 is a cross-section of the reel of Figure 1 taken along the line 2—2; and Figure 3 is a section of the reel of Figure 1 taken along the line 3—3.

Referring to the drawing the reel comprises two reel members 10 and 11. Reel member 10 is generally circular in form and it is advantageously cylindrical. The reel member 10 is concentrically mounted about the reel shaft 13, being supported thereon by circular end closures 15 and 16 bound and sealed to the reel shaft.

The end closures 15 and 16 are securely mounted and sealed to the reel shaft 13 to make them leak proof. The enclosure 15 is held about the shaft 13 by means of an end screw 17 adapted to force a cap 18 against a pliable sealing means 19 bearing against the shaft 13. The end closure 15 is thus sealed as well as frictionally bound to the shaft 13. As the cap 18 is forced against the sealing means 19 of the end closure 15 the end closure 16 is also forced against a collar 20 positioned about the shaft 13. The sealing means 21 contained in an annular space in the end closure 16 is compressed about the shaft 13 by the drawing of the cap 18 to, also, seal the end closure and to bind it to the shaft.

The closures 15 and 16 and the cylinder constituting the member 10 form a fluid-tight chamber 23. A heating fluid may be admitted to the chamber 23 of reel member 10 through an inlet 25 positioned in the forward part of the tubular reel shaft 13 and exhausted through the shaft outlet 24 in the other end of the chamber. The inlet 25 connects the core of an inner tube 27 in the shaft 13 with the chamber and the outlet 24 connects the chamber with an annular conduit 28 formed by the shaft 13 and the inner tube 27. Generally, the heating fluid is supplied by an exterior source; it is admitted to the chamber 23 through the tube 27 and opening 25, and it is exhausted through the opening 24 and annular passage 28.

The second reel member 11 is advantageously made up of a plurality of spaced bar members 12 positioned about the reel member 10. Five bars have been found to be particularly advantageous and they may be circumferentially spaced to permit the surface of the cylindrical member to emerge upon rotation between any two of the bar members 12 during each reel revolution. The number of bars 12, however, may be decreased to even as low as two advantageously spaced less than 180° in order to allow a temporary emergence of the cylindrical reel member periphery therebetween. The bar members 12 at their unsupported end merge into a reinforcing ring 30, and at their other end they merge into a flange 31. Flange 31 in turn is secured to a flange 32 by means of screws 33. Since flange 32 forms part of a hub member 35 which is adapted to rotate on a pair of spaced bearings 37, 38 positioned about an eccentric sleeve 40, the reel member 11 is then also eccentrically positioned relative the cylindrical reel member 10.

The axis of the sleeve 40 is made offset and askew to the axis of the shaft 13 about which the reel member 10 is concentrically mounted. Such an arrangement of the axes is disclosed in the Knebusch Patent No. 2,210,914. Within the eccentric sleeve 40 there is a bushing 41 providing a bearing for the reel shaft 13. The shaft extends beyond the bushing and the extended portion is provided with a driving gear 43 which is secured to the shaft 13 by means of a set screw 44 passing through a hub portion of the gear 42 to bear against the shaft.

The reel member 11 supporting hub member 35 is provided with a sheave or pulley 45 in which runs a driving belt 46. The two reel members are thus adapted to be separately driven. The driving belt 46 can be replaced by a positive driving means such as a toothed gear if desired. Advantageously the entire reel structure is adapted to be supported in the operating face of a continuous process machine (not shown) by a flange 50 forming part of the eccentric sleeve 40. Upon a relative rotation of the two reel members 10 and 11, thread or the like will be advanced lengthwise of the reel in the form of a helix. The thread will be temporarily alternately supported by the bar members 12, then by the cylindrical reel member 11 as its surface emerges outwardly between an adjacent pair of the bar members 12.

I claim:
1. A thread-advancing reel comprising, a hollow shaft, said hollow shaft being adapted to conduct and exhaust a heating fluid, longitudinally extending enclosed cylindrical reel member of constant diameter concentrically positioned about said hollow shaft, inlet and outlet means for a heating fluid in said shaft positioned within said cylindrical reel member, a second longitudinally extending reel member having a plurality of spaced bar members positioned about said cylindrical reel member, said second reel member rotating about an axis that is offset and askew to the axis of said shaft and arranged so that upon relative rotation of both reel members the surface of said cylindrical reel member is adapted to extend outwardly between successive spaced bar members, and means for driving each of the reel members.

2. A thread-advancing reel comprising, a hollow shaft being adapted to receive and exhaust a heating fluid a reel member comprising an enclosed smooth surfaced cylinder for the circulation of a heating fluid therethrough concentrically mounted about said shaft heating fluid inlet and outlet means in said shaft and within said enclosed cylinder being adapted to admit and exhaust a heating fluid thereupon, a second reel member having a generally discontinuous circular periphery of spaced longitudinally extending bar members mounted for rotation about said shaft, said second reel member having a diameter larger than that of said first reel member and being positioned about said first reel member to rotate about an axis that is offset and askew to said first reel member, the spacing of the bar members of said second reel member being such so that upon relative rotation of the reel members the periphery of the cylindrical reel member is adapted to emerge between at least two successive spaced bar members, and means for driving said reel members.

THOMAS S. MAYNER.

REFERENCES CITED

The following references are of record in the file of this patent:

UNITED STATES PATENTS

| Number | Name | Date |
| --- | --- | --- |
| 2,302,792 | Moritz | Nov. 24, 1942 |
| 2,309,821 | Bergmann | Feb. 2, 1943 |
| 2,398,808 | Slayter et al. | Apr. 23, 1946 |